July 29, 1952
J. H. COOK
2,605,459
MONITORING APPARATUS FOR RADIO
PULSE TRANSMISSION SYSTEMS
Filed Oct. 23, 1943
2 SHEETS—SHEET 1
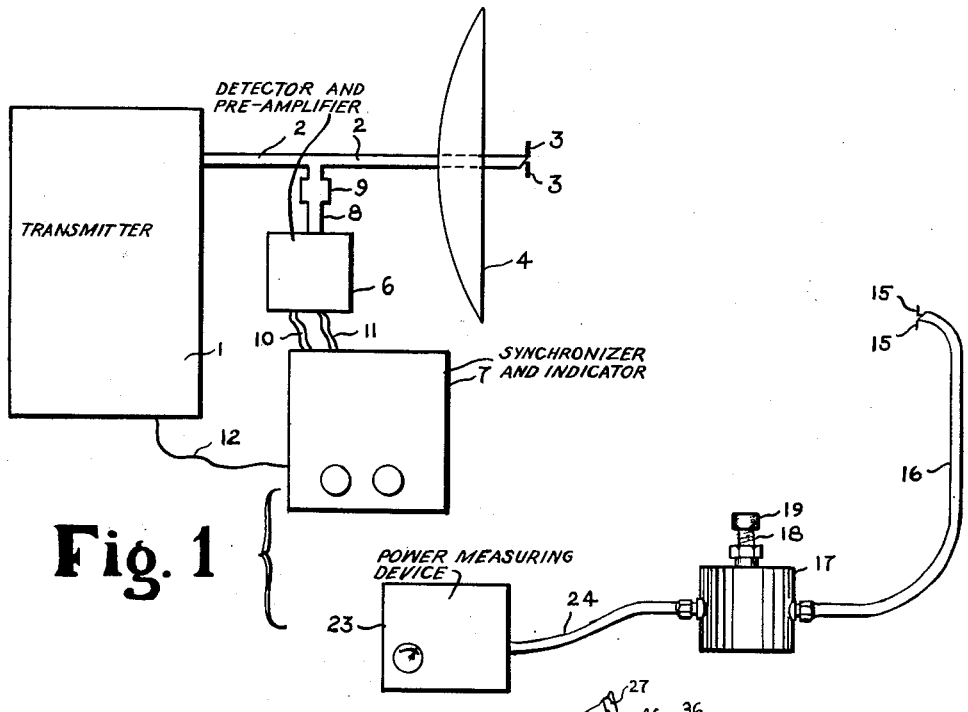
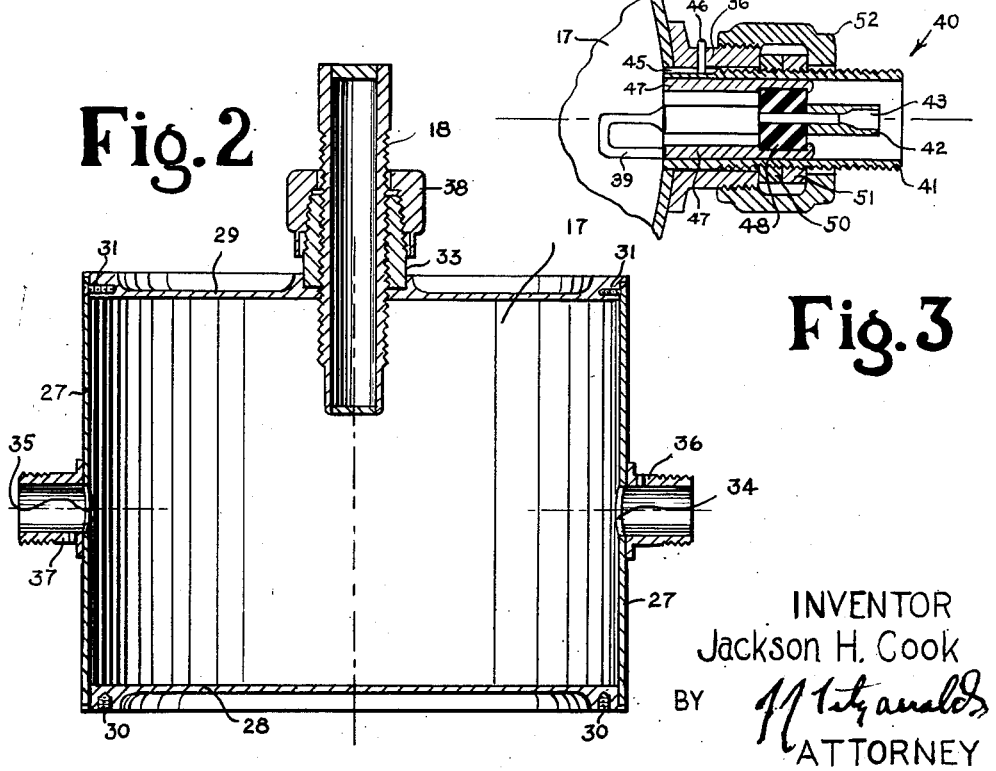
INVENTOR
Jackson H. Cook
BY
ATTORNEY

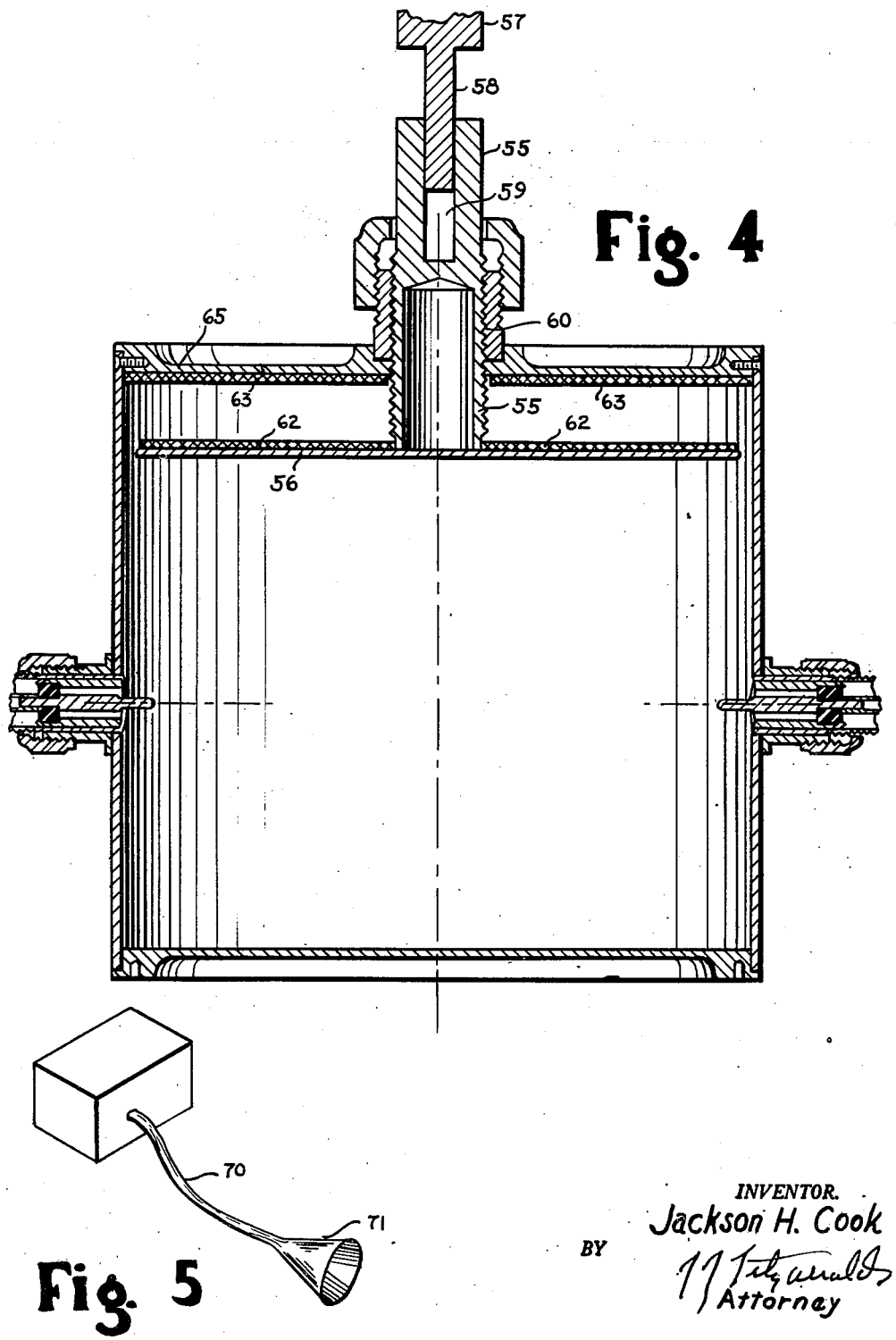

Patented July 29, 1952

2,605,459

UNITED STATES PATENT OFFICE 2,605,459

MONITORING APPARATUS FOR RADIO PULSE TRANSMISSION SYSTEMS

Jackson H. Cook, Arlington, Va., assignor, by mesne assignments, to the United States of America as represented by the Secretary of the Navy Application October 23, 1943, Serial No. 507,464

7 Claims. (Cl. 343—5)

This invention relates to systems for transmitting and receiving intermittent pulses of high-frequency radio energy and particularly to apparatus and methods for testing the operation of such systems, monitoring them during service, and determining the characteristics of such systems or components thereof.

In the operation of systems for the detection and location of objects by the radio-echo method it is highly desirable to provide an arrangement capable of furnishing a rapid check of the overall operation of the system in order to assure the operator that a failure of the system to locate any objects results from the absence of objects and not from improper operation or failure of the system or any part thereof. It is further desirable that such arrangement as may be provided for checking the operation of the system should be able to furnish at least a roughly quantitative indication of the effectiveness of the system.

I have found that certain types of cavity resonators may be adapted to store up energy during the transmission of a pulse of radio energy and then to give out that energy, or a great proportion of it, at a sufficiently high power level and for a period of time sufficiently long to permit energy so given out to be picked up by the receiver of the system being tested. I have found, moreover, that the period of time for which the energy given out by the resonator can be perceived by the indicatinig apparatus of the receiver of the system being tested bears a relatively simple relation to the effectiveness of the system and that it is possible to associate apparatus with the resonator which enables one to observe not only the overall effectiveness of the system, but also the separate effectiveness of the receiver and of the transmitter.

The invention is illustrated in the annexed drawing in which:

Fig. 1 shows, in a diagrammatic manner, a system for the transmission of pulses of radio-wave energy such as is used for the detection and location of objects, together with apparatus according to the present invention for testing and measuring the effectiveness of such systems;

Fig. 2 shows in cross section one type of resonator adapted for use in accordance with the present invention for testing radio transmitting and receiving systems;

Fig. 3 is a cross section in a plane perpendicular to the section shown in Fig. 2 illustrating how a coaxial-conductor transmission line may be coupled to the resonator shown in Fig. 2;

Fig. 4 is a diametral cross section of a form of resonator adapted for use in accordance with the present invention and having improved means for tuning said resonator, and Fig. 5 is a perspective view of another type of resonator adapted for use in accordance with the present invention.

The radio transmission and receiving system shown in Fig. 1 comprises a transmitter 1 for generating intermittent high-intensity and short-duration pulses of high-frequency radio waves, a transmission line 2 and an antenna 3 for radiating said waves into space and for picking up echoes of the radiated waves reflected by objects lying in the path of said waves. Associated with the antenna 3 is a reflector 4 for the purpose of concentrating radiation in a relatively narrow beam and for providing a directive sensitivity characteristic of the antenna system during reception. The system comprising the antenna 3, the reflector 4 and the included portion of the transmission line 2, it is understood, may be movable in different ways, suitable articulated joints being provided in the transmission line 2. Such arrangements are not indicated in Fig. 1 in order to simplify the illustration.

A receiver 6, 7 is connected with the transmission line 2 by means of a transmission line 8 with which is associated a protective electric breakdown device 9. The receiver is shown as consisting of two units indicated at 6 and 7, the unit 6 including the first detector and the first few stages of amplification, while the second unit is shown at 7 includes further stages of amplification and the like, indicator apparatus which may be one or more cathode ray tubes, and various synchronizing circuits. The units 6 and 7 are connected together by the cables 10 and 11 and a wire 12 is shown connecting the transmitter 1 and the unit 7 of the receiver for the purpose of synchronization.

In order to provide a test in accordance with the present invention a dipole 15 is provided, preferably in a fixed reference position which is connected to a transmission line 16 which is preferably of the coaxial-conductor type. The transmission line 16 is coupled as shown in Fig. 3 to a resonator 17 (Fig. 1). The resonator 17 is provided with a tuning arrangement 18 which may be controlled by a hand knob 19 or, if desired, by a remotely controlled motor (not shown) coupled to the tuning apparatus 18. If it is desired in the test of the radio transmission and reception system to determine separately the effectiveness of the transmitter and of the receiver, a power-measuring device may be connected to the resonator 17, such a device being shown at 23 connected to the resonator 17 by means of a transmission line 24. The power-measuring device 23 may be a calibrated detector-amplifier arrangement or it may be a bridge-type system employing a bolometer element, together with suitable amplifying and indicating arrangements.

The principal condition for the success of a testing and measuring system such as that shown in Fig. 1 is that the resonator 17 is able to store a substantial amount of energy during the operation of the transmitter 1 and that this energy is re-radiated from the dipole 15 over a period long enough to permit it to be detected in the receiver 6, 7. The protective electrical breakdown device 9 requires a definite time, say a few microseconds, after the operation of the transmitter 1 to return to its normal condition, so that the sensitivity of the receiver is effectively kept below normal for a few microseconds after the operation of the transmitter 1 until the device 9 has "recovered." In order to test the system with the receiver operating under normal conditions it is desirable that the dipole 15 should continue to give out a detectable signal until a time after the recovery of the device 9 is substantially complete. In such case it will be possible not only to test the receiver 6, 7 but also to determine the recovery characteristic of the device 9.

If for the resonator 17 a box the dimensions of which are large with respect to wave length is used, a signal may be detected for a reasonably long period, say about ten microseconds, after the operation of the translator 1 has ceased without the necessity of tuning the resonator, the box being in this case a cavity capable of entertaining oscillations in a large number of modes over a considerable range of frequencies, so that it may be regarded as nonresonant, being not particularly selective as to frequency, insofar as its response is concerned. Preferably, such a box is made in the form shown in Fig. 5 with unequal dimensions each exceeding several wave lengths and with a coupling wave guide 70 entering at an asymmetrically located point. The pick-up and radiating device is in this case the horn 71. If the box is made with highly conducting inner surfaces, it will exhibit a high "Q" in the sense that oscillations will require an appreciable time to die out to an undetectable level.

In order to provide for relatively great energy storage, low losses, and extended re-radiation time, the resonator 17, made in the form of a tunable cavity-type electrical resonator is excited into a mode of oscillations such that the cavity exhibits a high "Q," which is to say that the energy loss per cycle is small compared to the energy stored (being usually from one ten-thousandth to one fifty-thousandth of the energy stored).

When a high Q resonator is employed and suitably coupled to the transmission line 16, not only does the signal radiated by the dipole 15 remain perceptible for a relatively long period, which may be 20 microseconds or more, but the intensity of the re-radiated signal decreases in a characteristic fashion that permits measurement of the effectiveness of the radio transmitting and receiving system with great accuracy by observing the time at which the signal radiated from the dipole 15 becomes imperceptible or the time at which the said signal produces any other predetermined amount of response in the receiver. More particularly, the amount of energy stored in the resonator 17 during a short pulse of radio waves, which may have a duration of about one microsecond, will vary logarithmically with the power output of the system radiated in the direction of the dipole 15; furthermore, the decrease of the intensity of the signal radiated from the dipole 15 after the said pulse has passed will also be logarithmic in character. The elapsed time between the predetermined part of the originally transmitted pulse of energy and the time at which the signal from the dipole 15 becomes imperceptible will thus directly give a measure of the overall effectiveness of the system. The time measurement will then represent relative system effectiveness on a scale such that results can be expressed in terms of the commonly used power ratio unit, the decibel, by reference to a relatively simple relation involving such substantially constant factors as the attenuation between the dipole 3 and the dipole 15, and the characteristics of the resonator 17 and its coupling to the transmission line 16, as more fully explained hereinafter.

If a power-measuring device 23 is coupled to the resonator 17 so that the energy stored therein during the pulse radiated from the antenna 3 may be directly measured, such measurement may serve to indicate the power output of the transmitter when the device is suitably calibrated. By combining such measurement of transmitted power with the overall measurement of the effectiveness of the system determined from the length of time the signal from the dipole 15 remains perceptible in the receiver 6, 7, which time may be referred to as the "ringing time," the receiver sensitivity can readily be calculated, since for a given amount of energy stored in the resonator 17, the ringing time will be substantially directly proportional to the sensitivity of the receiver measured in the usual logarithmic units. The methods of measurement here involved are so accurate that the characteristics of the resonator 17, its coupling to the line 16, the dipole 15, and its relation to the dipole 3 may be determined by a simple series of tests involving the introduction of known amounts of attenuation in the transmitter, receiver, or both and noting the ringing time under various conditions. Thus the installation of the test apparatus of the present invention in service location does not require any extensive amount of auxiliary calibrating apparatus. The characteristics of the resonator may, if desired, be determined with high accuracy in the laboratory for purposes of calibration.

For quantitative measurements of system performance the dipole 15 should be maintained in a position which is fixed with regard to the transmitter 1. If the antenna system 3, 4 is of the moving type, it is not necessary that the antenna 15 should move therewith, for if it is maintained in a position which is fixed relative to the mounting of the antenna system, measurements of system performance of good accuracy may still be obtained. The indication resulting from the radiation from the dipole 15 will then occur only when the antenna is pointing in the general direction of the dipole 15.

If a revolving antenna system is mounted in a location clear from interfering echoes from nearby objects, a test apparatus in accordance with the present invention may be employed in a fixed position to determine the directional pattern of the antenna, for as the antenna revolves, the dipole 15 will have various different angular relations to it. By means of "range-tracking" systems that are now known, the ringing time for various positions of the antenna may be caused to be recorded, if desired.

The testing apparatus of the present invention as illustrated in Fig. 1 is of such compact form that it may be conveniently mounted in an aircraft for the purpose of monitoring the operation of a radio-echo detection and location system. If the antenna of the latter system is of the revolving type and the dipole of the test system has a fixed location in the aircraft, the ringing time as observed in the receiver will be a maximum when the antenna is pointed directly at the dipole of the test apparatus. In this manner the direction in which the aircraft is oriented, or a direction fixed in relation thereto, may be indicated, for purposes of reference, directly on the indicating device on which the location of other objects is indicated.

It is important in most cases for satisfactory operation that the resonator 17 should be tuned. Although in ground installations this may conveniently be done manually by manipulation of the knob 19, for installations in aircraft and small ships it is advantageous to provide remote-control tuning by means of a small motor (not shown) coupled to tuning means 18. Proper tuning can readily be obtained by maximizing the response in the receiver 6, 7 or by maximizing the response of the power-measuring device 23. Such tuning may be effected with sufficient rapidity to make it practical to keep the resonator 17 de-tuned during normal operation of the radio-echo location system and to tune it only for short periods during which a check on system operation is desired. By such de-tuning, the effect of the dipole 15 upon the radiation characteristics of the antenna systems 3, 4 may be reduced. Where the physical disposition of the components may be arranged so that the dipole 15 has little or no effect upon the radiation characteristics of the antenna systems 3, 4, it is entirely unnecessary to de-tune the resonator 17 in order to realize the full advantage of the radio-echo detection and location systems. If it is desired to eliminate the signal produced by the test apparatus except during predetermined check periods a switch (not shown) may be provided in the transmission line 16 or the line 16 may be decoupled from the resonator 17 by some suitable control device (not shown).

No special form of indication in the receiver 7 is necessary for use of the testing system indicated in Fig. 1, that is to say, any of a number of forms of indication in common use may be employed. Thus in the "range only" type of indication in which the indicator is provided with deflection in one direction proportional to time and in another direction at right angles proportional to the intensity of the signal, the signal produced by the operation of the testing system will be readily observable and the ringing time readily measurable. Since an echo obtained from an object at a distance of one mile is received 10.75 micro-seconds after the original signal was transmitted radiation picked up from the dipole 15 over a period of about 20 microseconds will occupy the first two "miles" of the indicator. If the indicator is provided with a fast sweep, corresponding to only a few miles maximum range, the ringing time can be determined with great accuracy. Even on slower sweeps considerable accuracy can be obtained. For measurements of the highest accuracy a delayed fast sweep, such as a 15 microsecond sweep beginning 10 or 15 microseconds after the transmitted pulse, is desirable. Such sweeps are used in certain types of radio-echo location apparatus.

Other types of indication, as above noted, may also be used, such as "type B" or "type P"—indeed, any type of indication which presents range (i. e., elapsed time) information. In the type B and type P methods of indication where azimuth and range are presented, the position of maximum response from the test apparatus may also serve as a reference axis indicating the orientation of the craft on which the apparatus may be mounted.

The test apparatus illustrated in Fig. 1 may also be used to measure the frequency at which the radio system is operating. The type of resonator shown at 17 in Fig. 1 and further illustrated in Figs. 2 and 3 is highly selective as to frequency and, furthermore, the frequency varies linearly with the axial displacement of the tuning plunger 18 over a considerable range of such displacement, so that the frequencies can simply and accurately be measured by tuning the resonator 17 for maximum response. The sharpness of tuning of the resonator 17 is sufficiently great so that it may be determined whether the transmitter 1 is operating at a single frequency or is operating at two frequencies simultaneously which lie very close together. The latter type of operation is known as "moding" or "double-moding" and is usually indicative of loss of transmitter and system efficiency. It is quite important that such undesired types of operation should be detected in service. With the test apparatus herein described, simultaneous operation of the transmitter at several frequencies can readily be detected by varying the tuning of the resonator 17 and observing whether the ringing time passes through a single maximum or through several maxima. Instead of the ringing time, the response of the power-measuring device 23 could be observed, in which case the apparatus is used as a simple panoramic receiver, the frequency discrimination in this case, however, being unusually high because of the high Q of the resonator 17. It is to be understood, however, that in compact installations the power-measuring device 23 may be omitted in which case the ringing time could be used for the purpose of detecting whether "multiple-moding" is occurring.

If successive pulses are emitted at widely different frequencies, which corresponds to a condition of severe moding, a loss of intensity of the signal on the indicator screen will result because of the failure of the receiver to respond to some of the pulses. If successive pulses are at frequencies which lie close together, the ringing time will vary between pulses, so that the pattern seen on the indicator will have a readily distinguishable striation. A similar striation will be observed if there is "jitter" in the magnitude of the voltage pulse applied to the transmitting tube of the system. When successive transmitted pulses are at the same frequency and have the same intensity, which will be the case when the system being tested is operating in the manner usually desired and regarded as normal, the return signals of the test apparatus from successive pulses will reinforce each other to provide a bright and distinct indication on the indicator device of the receiver. The echo-box test equipment, as equipment of this invention may be called, may be used for tuning the receiver to the transmitter, but it is to be noted that tuning of the breakdown device 9 can be done effectively only if the recovery time of the device 9 is shorter than the ringing time of the echo box.

Thus it will be seen that there is a variety of practical uses for the apparatus of the present invention, in addition to the fundamental use of providing a measurement of overall system effectiveness, including receiver sensitivity. The possibility of making a rapid check of receiver sensitivity is particularly important because such measurements were previously not obtainable without relatively elaborate apparatus. The apparatus of this invention enables accurate check on receiver sensitivity to be made with the radio-echo location system in service position even when installed in an airplane or other relatively small craft.

Instead of exciting the resonator 17 from a dipole antenna 15, the transmission line 16 might be directly coupled to the transmission line 2 through a suitable attenuator, if desired. In such case, however, it would be desirable to provide some means for distinguishing between transmitter power proceeding from the transmitter to the antenna 3 and waves internally reflected within the system which may build up standing waves in the transmission line 2. This may be done by the interposition of a suitable filter in the junction between the transmission lines 16 and 2.

Figs. 2 and 3 show details of one form of construction of the resonator 17. Such resonators are sometimes called "echo boxes" because of their application in connection with the present invention for the testing of radio transmitting and receiving systems by the ringing time method. The resonator 17 consists essentially of a cylindrical enclosure provided with means for exciting the cavity of the $TE_{0,11}$ mode of oscillation. In this mode of oscillation the electric field contours form circles coaxial with the cylindrical resonator. There are certain outstanding advantages of resonators operating in this mode for the purpose of the present invention. The principal advantage is that the losses are extremely low, possibly because the electric field does not intersect the resonator wall. It is possible to obtain values of Q as high as 50,000, or even more, because the losses are so low. Another advantage of this type of resonator is that when an axial plunger is inserted from one end, a smooth transition between the $TE_{0,11}$ mode of a cylindrical resonator and the corresponding mode of a coaxial resonator (which is a section of coaxial line short-circuited by a disk at either end) can be obtained, which is accompanied by a small increase in resonant frequency. For insertions of the central plunger extending to between 30 and 75 per cent of the axial length of the cavity, the variation in wave length with plunger insertion has been found to be substantially linear. The rate of frequency change with plunger displacement is relatively small so that frequency can be accurately measured or the plunger accurately set without mechanical difficulties. For tuning over a wider range than is practical with the type of plunger shown in Fig. 2, the form of tunable resonator shown in Fig. 4 is preferably used. The latter type of resonator has the advantage that the Q remains relatively high over a considerable tuning range.

In a resonator such as that of Figs. 2 and 3, the Q is likely to be higher for the relatively retracted positions of the central plunger, so that it is usually desirable to design the resonator for operation with a plunger displacement range such that the plunger does not extend more than half way down the cavity and indeed it is preferable to limit the plunger to the upper quarter or third of the cavity. Such a resonator has been found to have an adequate tuning range for use in testing radio transmitting and receiving systems in practice. In a resonator such as that shown in Fig. 2, in which the diameter is approximately 20 per cent greater than the axial length or height, the diameter is approximately 1.4 wave lengths and the height approximately 1.1 wave lengths, the wave length referring to the free-space wave length of the mean frequency for which the apparatus is designed, which is the resonant frequency of the device when the plunger occupies about one-quarter or slightly less of the axial length of the resonator. It will thus be seen that the resonator may be a conveniently compact device. It will also be seen that the resonator is of such dimension that a number of other modes of oscillation are possible at frequencies not greatly different from the resonant frequency of the desired mode, so that care must be taken to excite the desired mode in a manner that will not also excite other modes.

As a precaution against interference of other modes of oscillation, wires of resistive material may be arranged in the resonator cavity in such a manner as to lie at right angles to the electric field of the desired mode and at the same time to absorb energy from oscillations in other modes. Likewise, suitable depressions, holes, grooves or slots at selected locations in the cavity wall may be used for selective damping of undesired modes. I find, however, that if proper care is taken in the manner of exciting the resonator, such arrangement for damping the oscillations in other modes are unnecessary because substantially no energy goes into the undesired modes of oscillation.

The dimensions of the resonator desired for a particular mean resonant frequency may be calculated to a fairly close approximation with theoretical formulae. Experimental procedures are also helpful in determining the desired dimension for a resonator of this type. The theoretical formulae for the wave length corresponding to the resonant frequency of a cylindrical cavity (with or without a central post axially thereacross) oscillating in the $TE_{0,11}$ mode is given by $$\lambda = \frac{2}{\sqrt{(1/h)^2 + (x/\pi r_2)^2}}$$

where $h$ is the axial height of the cavity, $r_2$ is the inner radius of the outer cylinder and $x$ is a solution of the equation $$\frac{J_1(x)}{Y_1(x)} - \frac{J_1(\eta x)}{Y_1(\eta x)} = 0$$

where $J_1$ and $Y_1$ are Bessel functions of the first and second kind, first order, and $\eta$ equals $r_1/r_2$, $r_1$ being the outer radius of the inner cylinder. Solving for $x$, and substituting the second equation in the first, the following relation is obtained:

$$\lambda = \frac{2}{\sqrt{\left(\frac{1}{h}\right)^2 + \frac{(3.832 + 6.5\eta^{1.65})^2}{\pi r_2}}}$$

which should hold for $0 \leq \eta \leq 0.35$.

From the above relation the resonant frequency for a resonator with no central plunger and also the resonant frequency of a resonator with the central plunger extending completely across the cavity can be calculated. The resonant frequency for intermediate position of the plunger may properly be expected to lie between these values. The calculations check with experimental results within a few per cent in the usual cases. The resonator may be made with a height greater than the diameter instead of with the diameter greater than the height, as in the resonator shown in Fig. 2. It will be seen from the above formula that the diameter should be at least about 1.24 times the longest wave length to be used. A relatively high ratio of height to diameter in a device of the form shown in Fig. 4 will result in a relatively narrow tuning range and a relatively low ratio of height to diameter in such a device will result in a broader tuning range but may involve greater possibilities of interfering modes of oscillation. Other shapes are also possible, such for instance as a spherical shape, but the cylindrical shape is preferred because it provides successful results and is at the same time relatively simple in construction.

If reduction of resonator dimensions is desired, the resonator may be filled partly or wholly with solid dielectric material. Complete filling of the resonator with such material will interfere with ease of tuning, but an axial hole can be provided in the dielectric body to permit movement of the tuning plunger, whereby the device may be tuned.

The resonator shown in Fig. 2 has a cylindrical metal wall 27 and two end disks 28 and 29. The disk 28 is preferably hard-soldered to the cylinder 27 and is provided with tapped recesses 30 for the purposes of fastening the device on a suitable support or framework (not shown). The end disk 29 is preferably detachable in order that the inside of the resonator may be occasionally inspected to ascertain that the inner surface has not been corroded or otherwise damaged. In order that a high Q may be obtained, the inner surface of the resonator is preferably silver-plated and polished. The disk 29 may be fastened to the cylinder 27 by machine screws 31 provided at frequent intervals around the periphery of the joints.

The disk 29 carries the plunger 18 with the help of a threaded sleeve member 33 which is hard-soldered to the disk 29. The plunger 18, the screw threads on the disk 29 and the structure 33 are preferably silver-plated in order to provide good electrical contact. The lower end of the plunger 18 may be smooth and polished. The upper end of the plunger 18 may be provided with a knurled surface for manual operation, or with a coupling to a motor shaft for remotely controlled operation. The sleeve 33 may be radially slotted at its upper end and is externally threaded to receive a nut 38 which is adapted to adjust the frictional contact at the screw threads where the structure 33 engages the plunger 18.

Coupling for interchange of energy between the resonator and suitable transmission lines are provided through two apertures 34 and 35 in the cylindrical wall 27 of the resonator located near the plane which perpendicularly bisects the axis of the resonator. Other locations of coupling means might be used instead. Suitable externally threaded sleeves 36 and 37 are associated with the apertures 34 and 35 respectively in order to provide for the installation of a coupling loop in the manner shown in Fig. 3. Fig. 3 shows a coupling loop mounted on the sleeve structure 36 and adapted to be connected with a coaxial-conductor transmission line through a standard type of coupling shown at 40. This coupling includes an externally threaded outer conductor 41 and an inner conductor 42 provided with a suitable recess 43. The tubular conductor 41 fits closely in the sleeve member 36 and is provided with a groove 45 which is adapted to engage a guide pin 46 projecting through a suitable aperture in the structure 36, for the purpose of fixing the orientation of the loop 39 with respect to the resonator 17. Inside the tubular conductor 40 another tubular conducting sleeve 47 is tightly fitted, to which one extremity of the loop 39 is fastened, preferably by hard-soldering it. At its right-hand end the tubular sleeve 47 grips an insulator 48 which holds the conductor 42 in proper alignment. A pair of lock-nuts 50 and 51 are threaded onto the outside of the conductor 41 and adjusted to a position corresponding to the extent of coupling with the resonator which is desired (the position of the lock-nuts determining the extent to which the loop 39 is inserted into the resonator). A threaded nut 52, mounted on the outer surface of the sleeve 36, is provided with a flange gripping the right-hand surface of the outer lock-nut 51 and is adapted thereby to hold the conductor 41 and the loop structure firmly in position. The degree of coupling may be varied by removing the nut 52 and adjusting the position of the nuts 50 and 51 on the conductor 41. Certain principles concerning the choice of the degree of coupling will be indicated below in the theoretical discussion of the operation of the testing system.

It will be noted that the loop 39 lies in a plane perpendicular to the axis of the resonator. This is the orientation best adapted to excite the desired $TE_{0,11}$ mode of oscillation with a minimum of interference from other modes. In the desired mode the lines of magnetic flux near the cylindrical wall will be approximately parallel to the axis, being relatively more concentrated near the mid-portion of the cylindrical wall than toward the ends of the cylindrical wall.

It is to be understood that other types of coupling between a resonator of the type shown in Fig. 2 and a suitable transmission means may be employed in connection with the present invention. Thus, for instance, a hollow-pipe wave guide might be used instead of the transmission line 16 and the coupling between such wave guide and the resonator 17 might be provided by simply connecting the pipe to the cavity, taking precautions to insure that the oscillations in the pipe are so oriented that when they reach the cavity they excite the desired mode therein. Likewise, instead of the dipole 15 the interchange of energy between the line 16, or an equivalent transmission means, and space may be accomplished by other means, such as a loop antenna or especially in case a hollow-pipe wave guide is used instead of the transmission line 16, a horn of the type known as an "electromagnetic horn" (compare Fig. 5). Devices for interchange of energy between an electrical transmission system and space may be referred to as a group as "radiator-interceptors."

An improved form of tunable resonator for use in apparatus in accordance with the present invention is shown in Fig. 4. The general form of the resonator cavity shown in Fig. 4 and also of the coupling arrangement is substantially the same as those in Figs. 2 and 3. The apparatus of Fig. 4, however, embodies a different method of tuning the cavity. The threaded plunger 55, instead of being itself the tuning element, serves to carry a disk 56 which essentially closes off the top of the cavity. Variation of the position of the disk 56 axially with respect to the resonator cavity effectively varies the axial length of the resonator, thus varying the resonant frequency, substantially in accordance with the above-mentioned formula. It is not necessary to provide for contact between the edges of the disk 56 and the cylindrical walls of the resonator since there is no tendency for currents to flow across the discontinuity in the resonator walls when the resonator is oscillating in the desired mode. The gap between the disk and the walls of the resonator should not be too large in order to avoid interfering modes of oscillation and it has been found desirable not to make the gap too small in order that the percentage variation of the clearance around the circumference of the disk may be kept relatively small, thus also serving to avoid interfering modes of oscillation. I find that a clearance of about 3 to 3½ per cent of the wave length is a satisfactory value.

A cylindrical resonator oscillating in the $TE_{0,11}$ mode is more sensitive, with respect to its resonant frequency, to changes in the effective axial length of the resonator than to the insertion of a plunger such as is shown in Fig. 2. The vertical travel of the plunger 55 may then be less in extent than that which would be employed for the same purpose with connection with the plunger 18 in Fig. 2.

The plunger 55 is shown in Fig. 4 engaged in a slip joint with a shaft 57 which is adapted to be driven by a suitable remote control motor. Various types of slip joints are known which might be used for this connection. In Fig. 4 the shaft 57 is shown having a tongue 58 engaged in a mortise 59 cut in the upper end of the plunger 55. The joint is adapted to maintain rotational connection between the shaft 57 and the plunger 55 while permitting relative longitudinal displacement of these two members in accordance with the action of the screw threads 60.

When it is attempted to operate the device of Fig. 4 over a relatively wide tuning range, it is found that, unless special precautions are taken, interfering modes of oscillation are set up, reducing the energy stored in the desired mode of oscillation. This is especially true for the lower positions of the disk 56. When only the upper positions of the disk 56 need be used, no special precautions are usually necessary to obtain satisfactory operation without undue interference from other modes of oscillation. For operation over a wider tuning range, however, it is desirable to provide some means for damping the undesired modes. The important undesired mode involves oscillations occurring in the "back cavity" above the disk 56, while the desired mode is such that no oscillations are induced in the "back cavity." In consequence, although selective damping arrangements in the main portion of the resonator cavity are of some assistance for damping undesired modes, it is advantageous to provide the damping arrangement in the "back cavity," where they are not restricted so much in the form which they may take. A particularly convenient way of damping the undesired modes of oscillation is to provide a coating of absorbing material, shown at 62 and 63 on the back (upper) surface of the disk 56 and of the lower surface of the lid 65 of the resonator. For the greatest effectiveness of the absorbing material the absorbing qualities of the materials must be such as to provide a substantial impedance match to the oscillations occurring in the surrounding space, so that a maximum of absorption and a minimum of reflection may occur at the surfaces coated with the said absorbing material.

It is found that for this purpose a highly suitable material is an aggregate of finely divided Permalloy, a highly permeable alloy of approximately 80% nickel and 20% iron, held together by a resinous binder, such material being the same as or similar to materials heretofore used for Permalloy "dust" cores for transformers, loading coils and other electromagnetic devices. Instead of Permalloy, other types of ferromagnetic materials having relatively good permeability may be used, also in a finely divided or "dust" state, the particles being coated with a binder in the usual way. Such materials are sometimes known in the trade as "poly-iron." Other types of absorbing materials may also be used, although the materials just described are believed to furnish by far the best results.

The absorbing material just described finds general usefulness in the high-frequency radio art because of its ability to provide high attenuation and extremely low reflection. Even a relatively thin layer of the material is able to produce a substantial amount of attenuation.

The high degree of accuracy and reliability realizable in the operation of apparatus according to the present invention may be illustrated by a brief theoretical consideration of the behavior of the testing system. It may be shown that the relation between the transmitted power radiated at the dipole 3, denoted by P and the power level of the signal received at the dipole 3 from the dipole 15, denoted by p may be expressed as follows:

$$p = \alpha^2 \beta^2 \gamma^2 P e^{\frac{\omega t}{Q}}$$

where $\alpha$ is the attenuation between the antennas 3 and 15 in each direction, which, if the distance between the antennas is sufficiently short to justify neglecting the divergence of the beam, may be simply the ratio of the effective cross-sectional area of the dipole to the area of the cross section of the parabolic reflectors 4; $\beta$ is the fraction of power transferred from the line 16 to the resonator 17 and also the fraction of power transferred from the cavity 17 to the line 16, assuming steady state conditions (so that this factor alone would give the peak value which would result if the transmitted signal from the dipole 3 were of sufficient duration) and $\gamma$ is the build-up of current at the end of the pulse transmitted from the dipole 3, which may be regarded as $$\frac{\omega t}{2Q}$$

when the pulse is very short (second and higher order term being neglected). $\gamma$ occurs raised to the second power because the build-up of power corresponds to the square of the current built up and $\alpha$ and $\beta$ appear raised to the second power because these factors enter twice, once with respect to the transmission of power from the dipole 3 to the resonator 17 and once on the reverse journey. The exponential term in the power equation represents the transient decay of current in the resonator after the excitation has ceased. The factors $\alpha$, $\beta$, and $\gamma$ may be grouped into a single factor $\delta$ equal to their product to give the following equation:

$$p = \delta^2 P e^{\frac{-\omega t}{Q}}$$

The ringing time $t$ will consequently be $$t = \frac{Q}{\omega} \log_e \delta^2 \frac{P}{p} = 2.3\ Q \log_{10} \delta^2 \frac{P}{p}$$

$$t = A \log_{10} \delta^2 \frac{P}{p}$$

In the latter expression the term $A$ may be used to replace 2.3 $Q$ for convenience. The time required for the signal as detected in the receiver to fall to the noise level where the power of the signal when it is at the noise level in the receiver output is $p_n$ will be given by the expression $$t_n = A \log \left(\frac{\delta^2 P}{p_n}\right)$$

which states the ringing time perceived in the receiver. If the receiver is improved by adjustment or otherwise so that the input signal power at which the signal becomes indistinguishable from the noise is $p_m$, instead of $p_n$, the difference in the perceived ringing time will be equal to $$A \log \frac{p_n}{p_m},\ \text{or}\ \frac{A}{10}$$

times the difference in power level between $p_m$ and $p_n$ expressed in db. Likewise, if the power output of the transmitter is changed the difference in ringing time will be equal to $$\frac{A}{10}$$

times the difference between the two transmitter power levels expressed in db, it being understood that an increase in ringing time indicates greater transmitter power output, or in the previous case greater receiver sensitivity (smaller $p_n$).

For a resonator having a Q of 20,000 and operating at a frequency of 3,000 megacycles per second, the change in ringing time with receiver sensitivity or with change in transmitter power output will be one microsecond change in ringing time for 4 db change in power level. By the construction of resonators having higher values of Q it is possible to provide testing apparatus having greater sensitivity to small changes in power level, so that one microsecond change in ringing time will correspond to two or three db. The above relation connecting the ringing time, the power level change and the Q can be employed to make a measurement of the Q.

Incrase of the coupling factor $\beta$ increases the fraction of the power received by the antenna 15 which is fed to the resonator, but it also lowers the Q of the resonator, for the latter value is equal to $$\frac{Q_0}{1+\beta}$$

where $Q_0$ is the so-called "unloaded Q," which is the Q which the resonator would have with zero coupling. Consequently, there is some particular value of coupling which will provide a maximum ringing time for a resonator having a given $Q_0$. This degree of coupling is difficult to calculate, but experimental results show that the coupling usually desired is relatively small and may be of the order of $\beta = 0.1$.

Apparatus according to the present invention provides a means for accurate testing of radio-echo location and detection systems with compact rugged equipment. A great deal of the important measurements which may be made therewith employ the indicator and timing circuits of the radio-echo system being tested. The nature of the indication which a test system of the above-described type is adapted to present is such that its interpretation is readily accomplished and does not require extensive calculations or the use of elaborate tables. The test apparatus here in question is capable of a variety of uses for obtaining different types of information about the system being tested.

What I desire to claim and secure by Letters Patent is:

1. High frequency apparatus comprising, a hollow cavity resonator having fixed end walls, a plate mounted within said resonator parallel to the ends of said resonator and arranged for movement in a direction perpendicular to the ends of said resonator, means for exciting said resonator with electromagnetic energy in a predetermined mode of oscillation, and means having energy absorptive qualities covering one end wall of said cavity and the side of said plate facing said one end wall for damping out oscillations of modes other than said predetermined mode excited in the space between said one end wall and said plate.

2. High frequency apparatus comprising a hollow circular cylindrical cavity resonator having fixed end walls, means for exciting said resonator with electromagnetic energy in a predetermined mode of oscillation, a circular conducting plate having a diameter less than the diameter of said resonator, said plate being secured to one end wall and oriented parallel thereto and arranged for movement in a direction perpendicular to said end walls, and a coating of energy absorptive material covering the mutually directed surfaces of said plate and said one end wall for suppressing oscillations of modes other than said predetermined mode excited in the space between said one end wall and said plate.

3. High frequency apparatus comprising, a hollow circular cylindrical cavity resonator having fixed end walls, means for exciting said resonator with electromagnetic energy in a predetermined mode of oscillation, a circular conducting plate having a diameter slightly less than the diameter of said resonator, means extending through a central opening in one of said end walls and secured at the center of said plate for moving said plate in a direction perpendicular to said one end wall while maintaining said plate parallel to said end wall to obtain a resonant condition within said resonator, and energy absorptive material positioned within the space defined by said one end wall and said plate for suppressing oscillations of modes other than said predeterminde mode excited within said space.

4. Apparatus for testing and checking systems for transmitting and receiving pulses of energy, which apparatus includes a hollow circular cylindrical cavity resonator having fixed end walls, means coupled to said resonator for exciting said resonator with pulses from said system whereby oscillations are set up in said resonator in a predetermined mode, said resonator being adapted to store energy from the pulses for a period longer than the duration of said pulses, a circular conducting plate having a diameter less than the diameter of said resonator being arranged within said resonator parallel to one of the end walls of said resonator, means for moving said plate in a direction perpendicular to said one end wall, and a coating of energy absorptive material covering the mutually directed surfaces of said one end wall and said plate for suppressing oscillations of modes other than said predetermined mode excited in the space between said one end wall and said plate.

5. Apparatus in accordance with claim 4 wherein said coating of energy absorptive material consists of finely divided ferromagnetic material held together with a resinous binder.

6. High frequency apparatus comprising, a hollow circular cavity resonator having first and second fixed conducting end walls, a circular conducting plate having a diameter slightly less than the diameter of said resonator, means extending through a central opening in said first wall and secured centrally of said plate for moving said plate in a direction perpendicular to said end walls while maintaining said plate parallel to said end walls, means located between said plate and said second end wall for exciting said resonator with electromagnetic energy in a desired mode, and a coating of energy absorptive material covering the mutually diretced surfaces of said plate and said first end wall for suppressing oscillations in modes other than said desired mode excited in the space between said first end wall and said plate.

7. Apparatus in accordance with claim 6 wherein said coating consists of finely divided ferromagnetic material held together with a resinous binder.

JACKSON H. COOK.

REFERENCES CITED

The following references are of record in the file of this patent:

UNITED STATES PATENTS

| Number | Name | Date |
| --- | --- | --- |
| 2,088,749 | King | Aug. 3, 1937 |
| 2,151,118 | King | Mar. 21, 1939 |
| 2,241,119 | Dallenbach | May 6, 1941 |
| 2,245,138 | Zottu | June 10, 1941 |
| 2,281,550 | Barrow | May 5, 1942 |
| 2,306,282 | Samuel | Dec. 22, 1942 |
| 2,421,016 | Deloraine et al. | May 27, 1947 |
| 2,433,868 | Sensiper | Jan. 6, 1948 |
| 2,439,388 | Hansen | Apr. 13, 1948 |
| 2,460,827 | Isely | Feb. 8, 1949 |
| 2,471,419 | Edson et al. | May 31, 1949 |
| 2,539,511 | Hansen et al. | Jan. 30, 1951 |